United States Patent
Hurley

(10) Patent No.: US 6,751,881 B1
(45) Date of Patent: Jun. 22, 2004

(54) DEFLECTION GAUGE DISLODGING SYSTEM

(76) Inventor: Lyndon J. Hurley, P.O. Box 70, Harrisburg, SD (US) 57032

(*) Notice: Subject to any disclaimer, the term of this patent is extended or adjusted under 35 U.S.C. 154(b) by 0 days.

(21) Appl. No.: 10/024,802

(22) Filed: Dec. 19, 2001

(51) Int. Cl.⁷ ................................................. G01B 5/00
(52) U.S. Cl. .................... 33/542; 33/501.45; 15/104.05; 15/104.31; 15/104.16
(58) Field of Search .................... 33/501.05, 501.08, 33/501.09, 542, 543, 544, 544.5, 555.1, 501.45, 545; 15/88, 104.31, 104.03, 104.05, 104.07, 104.068, 104.069, 104.16

(56) References Cited

U.S. PATENT DOCUMENTS

| | | | | |
|---|---|---|---|---|
| 1,134,342 A | * | 4/1915 | Maier | 122/379 |
| 1,972,402 A | * | 9/1934 | Jones | 15/104.31 |
| 3,108,302 A | * | 10/1963 | Whiteis | 15/104.16 |
| 3,533,166 A | * | 10/1970 | Pino, Jr. | 33/544 |
| 4,213,246 A | * | 7/1980 | Stevens | 33/544 |
| 4,418,572 A | * | 12/1983 | Prange | 73/866.5 |
| 4,521,968 A | * | 6/1985 | Wiltermood et al. | 33/542 |
| 4,766,631 A | * | 8/1988 | Crane et al. | 15/104.12 |
| 5,379,476 A | * | 1/1995 | Salecker | 15/104.31 |
| 5,966,768 A | * | 10/1999 | Hahn | 15/104.061 |

* cited by examiner

*Primary Examiner*—Diego Gutierrez
*Assistant Examiner*—Amy R Cohen
(74) *Attorney, Agent, or Firm*—Leonard & Proehl, Prof. L.L.C.; Jeffrey A. Proehl

(57) ABSTRACT

A deflection gauge dislodging system for performing deflection tests of pipes while permitting the deflection gauge to be readily dislodged from the interior of the pipe should it become stuck in the pipe. The deflection gauge dislodging system includes an elongate deflection gauge for measuring a minimum diameter of a lumen of a pipe. A dislodging apparatus is provided for dislodging the deflection gauge from a lodged condition in the lumen of a pipe. The dislodging apparatus is adapted to impact against the deflection gauge while the deflection gauge is positioned in the lumen of the pipe.

27 Claims, 3 Drawing Sheets

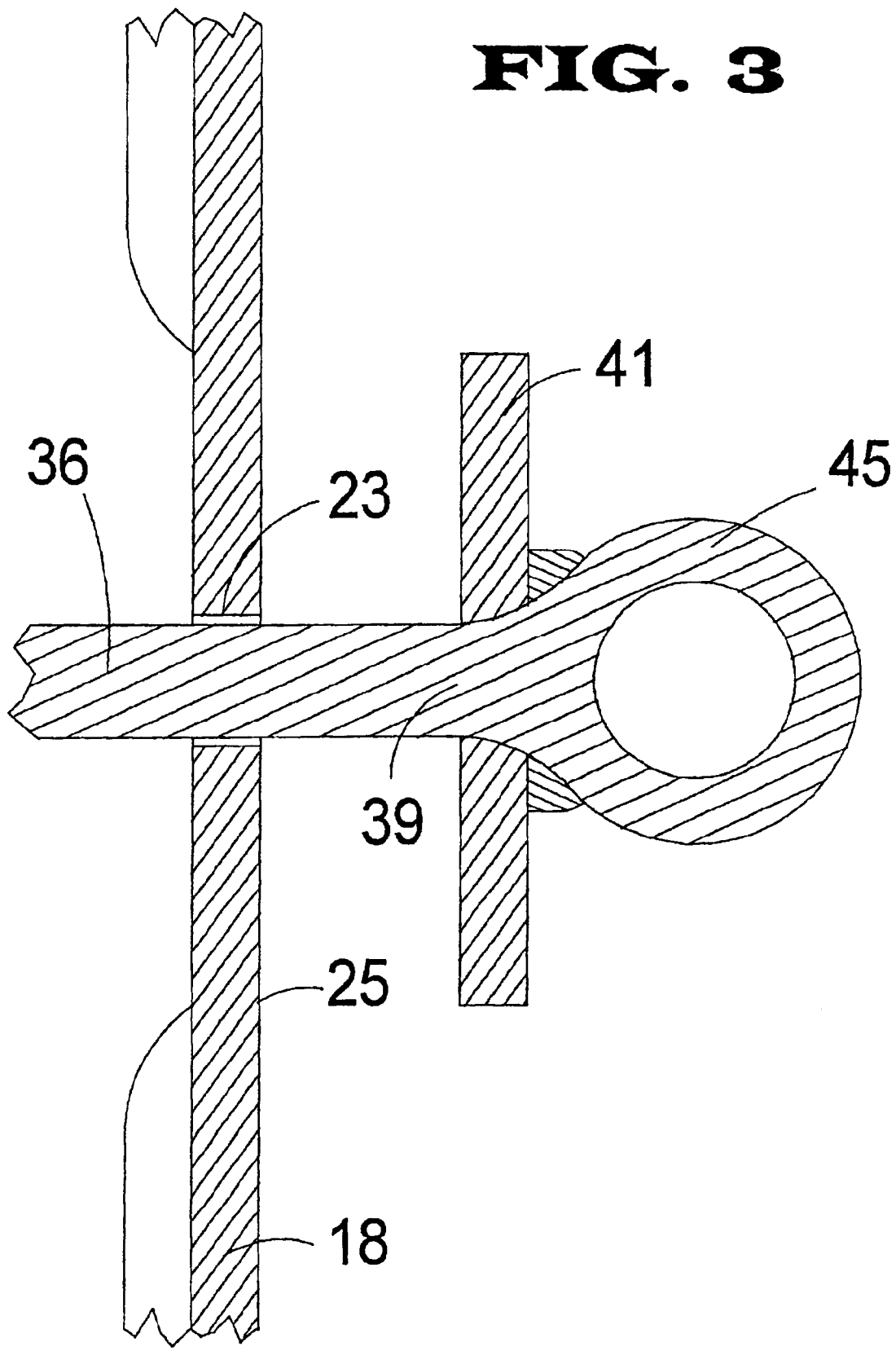

DEFLECTION GAUGE DISLODGING SYSTEM

BACKGROUND OF THE INVENTION

1. Field of the Invention

The present invention relates to deflection gauges and more particularly pertains to a new deflection gauge dislodging system for performing deflection tests of pipes while permitting the deflection gauge to be readily dislodged from the interior of the pipe should it become stuck in the pipe.

2. Description of the Prior Art

The use of deflection gauges is known in the prior art for measuring the existence of any significant deflection of the perimeter wall of a pipe in a manner that may affect the roundness of the pipe and/or partially reduce the cross sectional opening area of the pipe after the pipe has been placed (such as in a buried condition underground). This deflection of the perimeter wall may occur due to, for example, improper backfilling of the trench in which the pipe is laid, or a deterioration of the perimeter wall of the pipe over a period of time.

One deflection gauge known in the art employs a pair of spaced end plates and a plurality of elongated skids that are mounted on and extend between the spaced plates. This type of deflection gauge is inserted into a pipe with the elongate skids oriented substantially parallel to the longitudinal axis of the pipe, and the end plates are oriented transverse to the longitudinal axis of the pipe. The elongate skids are circumferentially spaced about the substantially cylindrical outer periphery of the deflection gauge, and the outer surfaces of the elongate skids may be precisely calibrated to the desired inner diameter for the pipe to be tested. Eyes are rigidly and non-movably mounted on each of the end plates, and cords or ropes are generally attached to both eyes of the gauge for pulling the gauge through a length of the buried pipe (usually between separated access points in manholes). If the deflection gauge of the appropriate inner diameter size moves freely through the interior of the pipe, it is known that the portion of the pipe tested has an inner diameter that is at least as great as the calibrated diameter of the deflection gauge, and little if no deflection has occurred in the tested portion of the pipe.

However, in pipes in which the perimeter wall has been deflected and the inner diameter has been reduced, a deflection gauge calibrated to the appropriate inner diameter of the pipe will in most cases be prevented from moving through the interior of the pipe by the deflection of the wall. Thus, the deflection gauge cannot continue to be pulled through the pipe once it has encountered the deflected wall area, and its movement has to be reversed in the direction from which the gauge came. This is accomplished by pulling on the cord that was trailing the gauge as it moved forward through the pipe. In some cases, the movement of the gauge into the area of the pipe in which the perimeter wall has been deflected can cause the gauge to become lodged or stuck in the area of decreased diameter, especially since tension on the leading cord may not be released immediately when the pipe wall deflection stops the gauge from moving. Often an attempt is made to yank the trailing cord from a loose condition to a taut condition in an attempt to jar the gauge free from the perimeter wall, although this technique can be difficult to perform, especially when the pipe is underground and access is only gained through a manhole. Typically, the apparatus for pulling the cord is located outside of the manhole and above ground, which makes it even more difficult to achieve a sufficient jerk of the cord to dislodge the deflection cord. This technique has proved to be unsatisfactory in many instances for dislodging the gauge, and thus a better way of dislodging stuck deflection gauges has been desired in the art.

SUMMARY OF THE INVENTION

In view of the foregoing disadvantages inherent in the known types of deflection gauges and known techniques for dislodging the deflection gauges, the present invention provides a new deflection gauge dislodging system wherein the same can be utilized for performing deflection tests of pipes while permitting the deflection gauge to be readily dislodged from the interior of the pipe should it become stuck in the pipe.

To attain this, the present invention generally comprises an elongate deflection gauge for measuring a minimum diameter of a lumen of a pipe and dislodging means for dislodging the deflection gauge from a lodged condition in the lumen of a pipe. The dislodging means is adapted to impact against the deflection gauge while the deflection gauge is positioned in the lumen of the pipe.

In one embodiment of the invention, the dislodging means may be movably mounted on the deflection gauge, and the dislodging means may be movable with respect to the deflection gauge in a direction oriented substantially parallel to the longitudinal axis of the deflection gauge. The dislodging means may be adapted to impact the deflection gauge in a direction oriented substantially parallel to the longitudinal axis of the deflection gauge. The dislodging means may include a slide member slidably mounted on the deflection gauge, and at least one stop member mounted on the slide member for limiting sliding movement of the slide member with respect to the deflection gauge.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic sectional view of one end region of the present invention.

DETAILED DESCRIPTION

Figure 1:
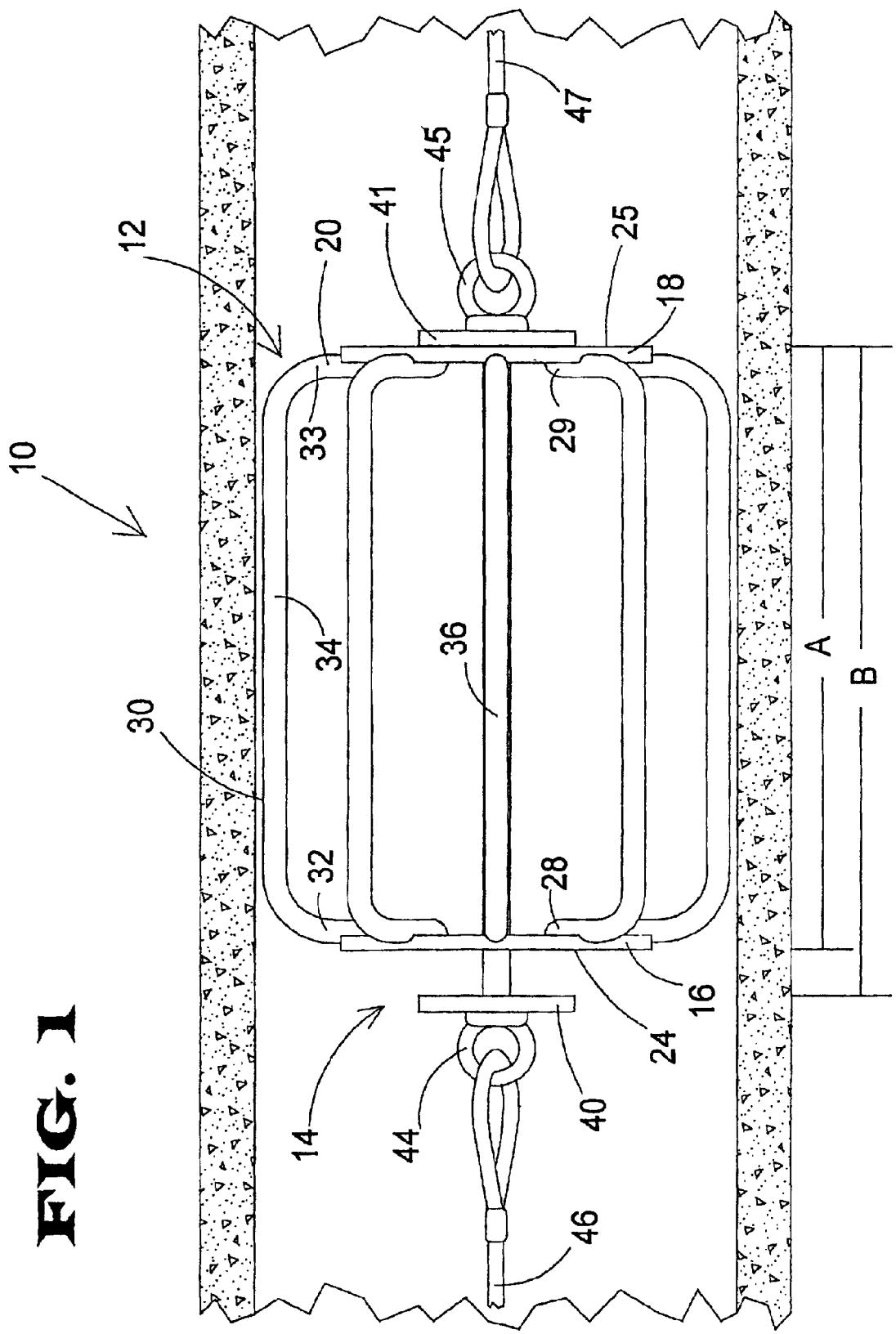
FIG. 1 is a schematic side view of a new deflection gauge dislodging system according to the present invention.
Figure 2:
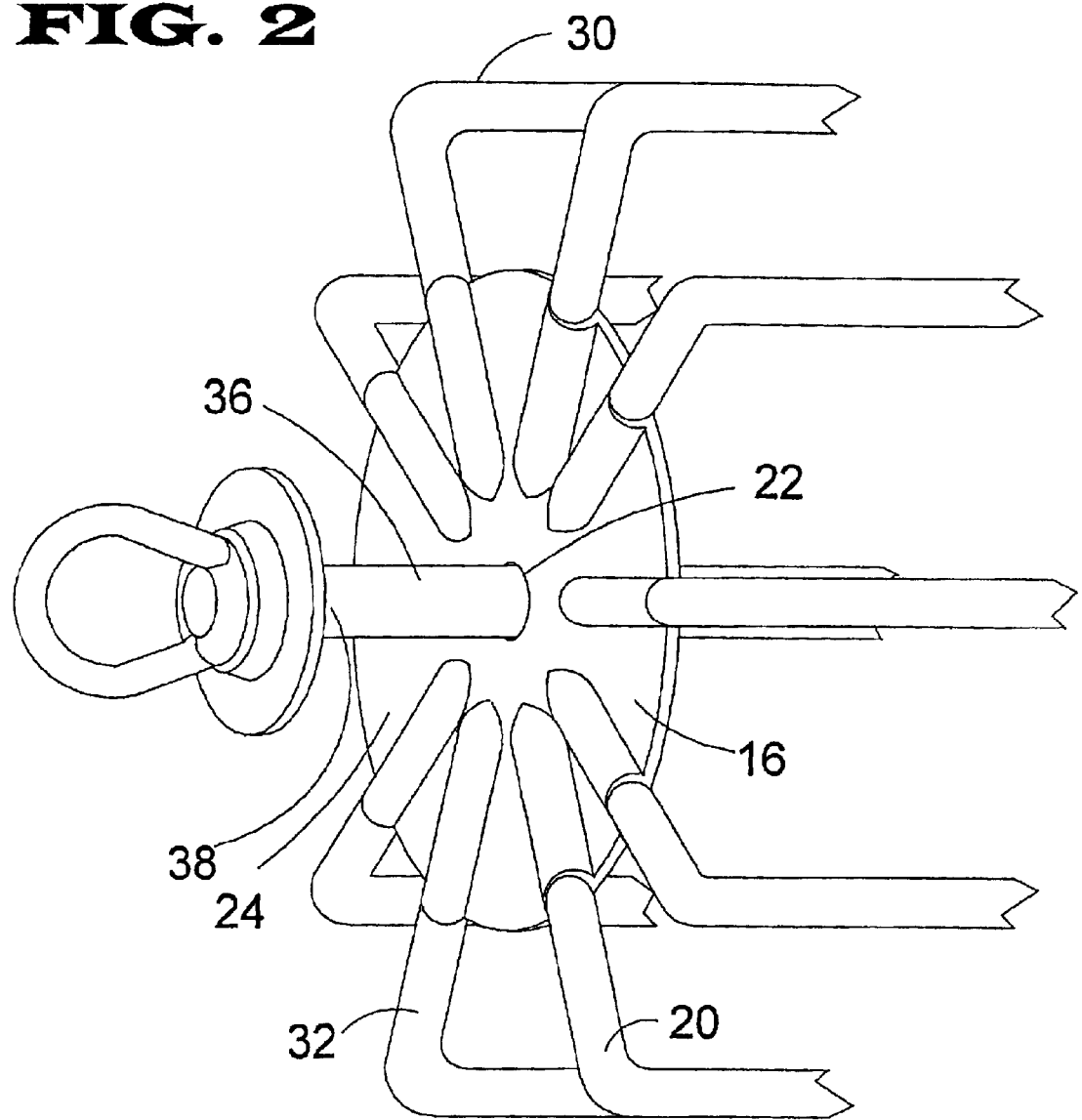
FIG. 2 is a schematic perspective view of one end region of the present invention.

With reference now to the drawings, and in particular to FIGS. 1 through 3 thereof, a new deflection gauge dislodging system embodying the principles and concepts of the present invention and generally designated by the reference numeral 10 will be described.

As best illustrated in FIGS. 1 through 3, the deflection gauge dislodging system 10 generally comprises a deflection gauge 12 for measuring a minimum diameter of a lumen of a pipe and a dislodging apparatus 14 for dislodging the deflection gauge from a lodged condition in the lumen of a pipe.

One highly suitable deflection gauge 12 for use with the dislodging apparatus 14 is elongate and may include a pair of longitudinally separated end plates 16, 18 and a plurality of skid members 20 extending between the end plates. Each of the end plates 16, 18 may have an aperture 22, 23 formed therein. The apertures 22, 23 on the end plates may be substantially axially aligned with each other, and in one embodiment of the invention are each positioned substantially centrally on the end plates. The outer surfaces 24, 25 of the end plates 16, 18 are separated by a first distance A.

The plurality of skid members 20 extends between the end plates 16, 18, and each of the skid members may have opposite ends 28, 29 being mounted on the end plates. The skid members 26 may have radially outermost surfaces 30 that define a calibrated diameter along a circumference of the defection gauge, so that passage of the deflection gauge through the lumen of a pipe indicates that the lumen of the pipe has a uniform dimension of at least the calibrated diameter of the deflection gauge. Each of the skid members 26 may have opposite end portions 32, 33 and an intermediate portion 34 that is positioned between the end portions. In one embodiment of the invention, the end portions 32, 33 may be oriented substantially perpendicular to the intermediate portion 34, and the end portions 32, 33 are oriented so they radiate outwardly from centers of the end plates.

The dislodging apparatus 14 of the present invention is preferably adapted to impact or strike against the deflection gauge 12 while the deflection gauge is positioned in the lumen of the pipe and the outermost surfaces 30 of the skid members have become lodged or pinched between inner surfaces of the pipe that are closer than the calibrated diameter of the deflection gauge. The dislodging apparatus 14 may be movably mounted on the deflection gauge 12 to assist in producing the desired impact. The dislodging apparatus 14 may be movable with respect to the deflection gauge in a direction that is oriented substantially parallel to the longitudinal axis of the deflection gauge and the direction of travel of the deflection gauge through the lumen of the pipe, to thereby cause an impact against the deflection gauge in a direction that is substantially parallel to the longitudinal extent of the pipe. In one embodiment of the invention, the dislodging apparatus may be slidably movable with respect to the deflection gauge 12 by pulling on a cord that is connected to the dislodging apparatus.

The dislodging apparatus 14 may include a slide member 36 that is slidably mounted on the deflection gauge 12. The slide member 14 may be elongate with opposite ends 38, 39. Significantly, the slide member 36 should have a length B between the ends 38, 39 that exceeds the distance A between the outer surfaces of the end plates to facilitate longitudinal movement of the slide member. In one embodiment of the invention, the length B is approximately two inches (approximately 5 centimeters) greater than the distance A, although other dimensional differences may be used. It will be realized that the greater the difference in the dimensions, the greater the impact that may be imparted to the deflection gauge. In one embodiment of the invention, the slide member 36 comprises a rod with a substantially smooth cylindrical outer surface, and end portions of the rod may have exterior threads.

The dislodging apparatus 14 may also include a stop member 40 that is mounted on the slide member 36 for limiting sliding movement of the slide member with respect to the deflection gauge, and the stop member may be mounted at an end of the slide member. The stop member 40 should have a feature, such as size, that prevents movement of the stop member through the aperture in the end plate of the deflection gauge so that the slide member is retained on the deflection gauge and is not easily removable from the deflection gauge without user intervention. In one embodiment of the invention, the stop member may comprise a plate, which may have a substantially circular perimeter and may lie in a plane oriented substantially perpendicular to the longitudinal axis of the slide member. Preferably, a pair of stop members 40, 41 are mounted on the slide member 36 with the pair of stop members being mounted on the opposite ends 38, 39 of the slide member so that movement of the slide member is limited to an extent in both longitudinal directions.

The dislodging apparatus 14 may also include a hook 44 that is mounted on the slide member 36. The hook 44 may be mounted on one of the ends 38, 39 of the slide member and may extend away from the slide member along the longitudinal axis of the slide member. The hook 44 may be located longitudinally outward of the stop member 40. A pair of hooks 44, 45 may be mounted on the slide member with the pair of hooks being mounted on the opposite ends 38, 39 of the slide member, and cords 46, 47 may be attached to each of the hooks. The pair of hooks 44, 45 facilitates pulling the deflection gauge in both directions in the pipe by the cords, but also permits the user of the system of the invention to impose a series of impacts on the deflection gauge when needed by allowing the user to pull the slide member in a direction opposite of the direction of impact to thereby "reload" the dislodging apparatus for a subsequent impact. Each of the hooks may preferably comprise a closed or continuous loop for the most secure connection of the cord.

It should be understood that the dislodging system may be employed on deflection gauges of various configurations, and the disclosed deflection gauge is just one highly suitable application of the disclosed dislodging system.

In use, when the deflection gauge is being pulled through the lumen of a pipe in a first direction and becomes lodged in the pipe (such as at a location where the inner surfaces of the pipe wall are excessively deflected), the slide member of the dislodging apparatus is moved in the first direction toward the first end of the deflection gauge by the cord pulling the deflection gauge. When the deflection gauge becomes lodged, the cord connected to the first end is released and the cord connected to the second end of the slide member and the deflection gauge is then pulled, preferably in a quick manner but without having to yank or jerk on the second cord. Since the slide member has a degree of free movement with respect to the deflection gauge, the slide member slides in the second direction until the stop member strikes or impacts the end plate of the deflection gauge and thereby stops the relative movement of the slide member with respect to the deflection gauge. The resulting transfer of momentum from the slide member to the deflection gauge is often sufficient to jar the deflection gauge loose from the lodged condition against the inner surface of the pipe, to thereby permit free movement of the deflection gauge in the pipe so that the deflection gauge can be retrieved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A deflection gauge with a dislodging system comprising:
   an elongate deflection gauge capable of determining a minimum diameter of a lumen of a pipe; and
   dislodging means for dislodging the deflection gauge from a lodged condition in the lumen of the pipe, the dislodging means being impactable against the deflection gauge while the deflection gauge is positioned in the lumen of the pipe;
   wherein the deflection gauge has longitudinally spaced opposite ends and includes at least one pair of skid members, each of the skid members extending in a longitudinal direction between the ends of the deflection gauge.

2. The deflection gauge with dislodging system of claim 1 wherein the dislodging means includes a slide member slidably mounted on the deflection gauge for sliding in a longitudinal direction oriented substantially parallel to the longitudinal axis of the deflection gauge, the slide member having opposite ends.

3. The deflection gauge with dislodging system of claim 2 wherein the deflection gauge includes a pair of spaced end plates, and wherein the slide member has a length greater than a distance between outer surfaces of the end plates of the deflection gauge.

4. The deflection gauge with dislodging system of claim 2 wherein the deflection means includes a stop member mounted on the slide member for limiting sliding movement of the slide member with respect to the deflection gauge.

5. The deflection gauge with dislodging system of claim 4 wherein the stop member is mounted at an end of the slide member.

6. The deflection gauge with dislodging system of claim 4 wherein the stop member and another stop member are mounted on the slide member with each stop being mounted adjacent to an opposite end of the slide member.

7. The deflection gauge with dislodging system of claim 2 wherein the dislodging means includes a hook mounted on the slide member for connecting a cord thereto.

8. The deflection gauge with dislodging system of claim 7 wherein the hook and another hook are mounted on the slide member with each hook member being mounted on an opposite end of the slide member.

9. The deflection gauge with dislodging system of claim 1 wherein the dislodging means is movably mounted on the deflection gauge such that the dislodging means is slidable with respect to the deflection gauge.

10. The deflection gauge with dislodging system of claim 1 wherein the dislodging means is movable with respect to the deflection gauge in a direction oriented substantially parallel to the longitudinal axis of the deflection gauge.

11. The deflection gauge with dislodging system of claim 1 wherein the dislodging means is slidably movable with respect to the deflection gauge by pulling a cord when the cord is connected to the dislodging means.

12. The deflection gauge with dislodging system of claim 1 wherein the dislodging means impacts the deflection gauge in a direction oriented substantially parallel to the longitudinal axis of the deflection gauge.

13. The deflection gauge with dislodging system of claim 1 wherein the deflection gauge comprises a pair of longitudinally separated end plates.

14. The deflection gauge with dislodging system of claim 13 wherein each of the end plates has an aperture formed therein, and wherein the dislodging means comprises a slide member extending in and being freely slidable through the apertures of the end plates.

15. The deflection gauge with dislodging system of claim 13 wherein radially outermost surfaces of the skid members defining a calibrated diameter along a circumference of the deflection gauge.

16. The deflection gauge with dislodging system of claim 1 wherein the deflection gauge has an outer calibrated diameter that is fixed in size and not adjustable.

17. The deflection gauge with dislodging system of claim 1 wherein the dislodging means is freely slidable with respect to all portions of the deflection gauge in a longitudinal direction of the deflection gauge.

18. The deflection gauge with dislodging system of claim 1 wherein the dislodging means is impactable against the deflection gauge without varying a calibrated diameter of the deflection gauge along a circumference of the defection gauge.

19. The deflection gauge with dislodging system of claim 1 wherein the pair of skid members are oriented substantially parallel to each other.

20. The deflection gauge with dislodging system of claim 1 wherein the deflection gauge has a central longitudinal axis extending between longitudinally spaced opposite ends of the deflection gauge, each of the skid members extending in a respective plane radiating outwardly from the central longitudinal axis of the deflection gauge.

21. The deflection gauge with dislodging system of claim 1 wherein the pair of skid members each have a radially outermost surface extending substantially parallel to a longitudinal axis of the deflection gauge.

22. The deflection gauge with dislodging system of claim 21 wherein the radially outermost surfaces of the pair of skid members define a uniform diameter along substantially the entire length of the plurality of skid members.

23. A deflection gauge with a dislodging system comprising:
a deflection gauge for measuring a minimum diameter of a lumen of a pipe, the deflection gauge comprising:
a pair of longitudinally separated end plates, each of the end plates having an aperture formed therein; and
a plurality of skid members extending between the end plates, radially outermost surfaces of the skid members defining a calibrated diameter along a circumference of the defection gauge, the radially outermost surfaces of the skid members extending substantially parallel to each other and substantially parallel to a longitudinal axis of the deflection gauge; and
dislodging means for dislodging the deflection gauge from a lodged condition in the lumen of a pipe, the dislodging means being impactable against the deflection gauge in a longitudinal direction of the deflection gauge while the deflection gauge is positioned in the lumen of the pipe, the dislodging means being movably mounted on the deflection gauge, the dislodging means being freely slidable with respect to all portions of the deflection gauge in a direction oriented substantially parallel to the longitudinal axis of the deflection gauge.

24. The deflection gauge with dislodging system of claim 23 wherein the dislodging means comprises:
a slide member slidably mounted on the deflection gauge, the slide member being elongate with opposite ends;
a pair of stop members being mounted on the slide member with each stop member being mounted on an opposite end of the slide member; and
a pair of hooks being mounted on the slide member with each hook being mounted on one of the opposite ends of the slide member.

25. A deflection gauge with a dislodging system comprising:
an elongate deflection gauge for measuring a minimum diameter of a lumen of a pipe, the deflection gauge comprising:
a pair of longitudinally separated end plates, each of the end plates having an aperture formed therein; and
a plurality of skid members extending between the end plates, each of the skid members having opposite ends with each of the ends being mounted on one of the end plates, radially outermost surfaces of the skid members defining a calibrated diameter along a circumference of the defection gauge, the radially outermost surfaces of the skid members extending substantially parallel to each other and substantially parallel to a longitudinal axis of the deflection gauge; and
dislodging means for dislodging the deflection gauge from a lodged condition in the lumen of a pipe, the dislodging means being adapted to impact against the deflection gauge while the deflection gauge is positioned in the lumen of the pipe, the dislodging means being movably mounted on the deflection gauge, the dislodging means being movable with respect to the deflection gauge in a direction oriented substantially parallel to the longitudinal axis of the deflection gauge, the dislodging means being slidably movable with respect to the deflection gauge by pulling a cord when the cord is connected to the dislodging means, the dislodging means being adapted to impact the deflection gauge in a direction oriented substantially parallel to the longitudinal axis of the deflection gauge, the dislodging means comprising:
a slide member slidably mounted on the deflection gauge, the slide member being elongate with opposite ends, the slide member having a length greater than a distance between outer surfaces of the end plate of the deflection gauge;
a pair of stop members being mounted on the slide member for limiting sliding movement of the slide member with respect to the deflection gauge, the pair of stop members being mounted on opposite ends of the slide member, each of the stop members being mounted at one of the ends of the slide member, the stop member comprising a plate, the plate lying in a plane oriented substantially perpendicular to the longitudinal axis of the slide member; and
a pair of hooks being mounted on the slide member with the pair of hooks being mounted on opposite ends of the slide member, each of the hooks being mounted on one of the ends of the slide member and extending away from the slide member along the longitudinal axis of the slide member, each of the hooks being located longitudinally outward of the stop member, each of the hooks comprising a closed loop.

26. The deflection gauge with dislodging system of claim 25 wherein the deflection gauge has longitudinally spaced opposite ends, each of the skid members extending in a longitudinal direction between the ends of the deflection gauge and being oriented substantially parallel to each other;
wherein the deflection gauge has a central longitudinal axis extending between longitudinally spaced opposite ends of the deflection gauge, each of the skid members extending in a respective plane radiating outwardly from the central longitudinal axis of the deflection gauge;
wherein the radially outermost surfaces of the plurality of skids define a uniform diameter along substantially an entire length of the plurality of skids;
wherein each of the skid members forms a loop comprising a pair of end portions and an intermediate portion extending between the end portions; and
wherein the intermediate portion is oriented substantially parallel to the central longitudinal axis and each of the end portions is oriented substantially perpendicular to the central longitudinal axis.

27. A deflection gauge with dislodging system comprising:
an elongate deflection gauge capable of determining a minimum diameter of a lumen of a pipe; and
dislodging means for dislodging the deflection gauge from a lodged condition in the lumen of the pipe, the dislodging means being impactable against the deflection gauge while the deflection gauge is positioned in the lumen of the pipe;
wherein the deflection gauge includes a pair of skid members, each of the skid members forming a loop comprising a pair of end portions and an intermediate portion extending between the end portions.

* * * * *